A. SMITH.
TYPE SETTING AND TYPE DISTRIBUTING MACHINE.
APPLICATION FILED APR. 14, 1913.

1,077,493.

Patented Nov. 4, 1913.
6 SHEETS—SHEET 4.

Fig. 8.

WITNESSES:

INVENTOR.
Abraham Smith
BY
ATTORNEYS.

UNITED STATES PATENT OFFICE.

ABRAHAM SMITH, OF ERIE, PENNSYLVANIA.

TYPE-SETTING AND TYPE-DISTRIBUTING MACHINE.

1,077,493.

Specification of Letters Patent. Patented Nov. 4, 1913.

Application filed April 14, 1913. Serial No. 760,971.

*To all whom it may concern:*

Be it known that I, ABRAHAM SMITH, a citizen of the United States, residing at Erie, in the county of Erie and State of Pennsylvania, have invented certain new and useful Improvements in Type-Setting and Type-Distributing Machines; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

This invention relates to type setting and distributing machines, and has for its object the construction of a machine adapted to be controlled by key mechanism so that the same will raise type from the type case and set them in their proper places in the line, and at the same time so adjust a record element by means of which said line of type can be distributed back into their proper compartments when desired; this invention being in the nature of a combination in one machine of the invention set forth and described in Letters Patent of the United States, Nos. 1,050,495, and 1,050,496, issued to me January 14, 1913.

The features of my invention are hereinafter set forth and explained, and illustrated in the accompanying drawings in which:—

In these drawings, A, indicates the end plates of my machine upon the lower ends of which the machine stands. Between the intermediate portions of these plates, A, I secure a series of type-cases, B, (see Fig. 1,) preferably in segmental form, each case thereof composed of type compartments or tubes. $b$, which radiate from a common center within the hollow shaft C, mounted and secured in the upper portion of the end plates, A. The type compartments or tubes, $b$, in cross section, are the shape of a type, and of sufficient size to permit a type to enter endwise and fall to the bottom thereof, each of said compartments $b$, being designed to be filled with type standing end on end. Each type case B, or row of compartments, $b$, representing a space in a line to be set up and printed. Through the bottom of each of the type compartments, $b$, are small vent openings $b'$, (see Figs. 3 and 4), through which air may enter the compartments during the process of drawing type therefrom.

In the upper portion of the end plates A, is secured a hollow shaft C, having a segmental opening or openings $c$, in the lower side thereof, and mounted on this hollow shaft C, between the end plates A, upon bearing rings D, is a series of oscillating tubular arms D', the upper ends of said tubular arms communicating with the openings $c$, in the wall of the hollow shaft C, coinciding with the segmental rows of type compartments $b$. Upon the upper sides of the bearing rings D, of the tubular arms D', and slightly to one side of the centers thereof project a series of arms $D^2$, having at their extremities weights $D^3$, adapted to cause said tubular arms D', to oscillate in one direction, and on the opposite side of each of said bearing rings D, I place a stop-arm $D^4$, for the purpose hereinafter set forth.

In the front edges of the end plates A, opposite the hollow shaft C, I make recesses $a$, in which is placed a record element E, hereinafter more fully described, in which is arranged a series of stops $e$, adapted to engage the stop arms $D^4$, at predetermined points in their oscillation.

The lower ends $d$, of the tubular arms $D'$, are somewhat enlarged, and the cavities therein are given a form in cross section similar to the form of the type compartments $b$, and are of a depth sufficient to receive a type therein.

Upon each end of the tubular shaft C, outside of the end plates A, I mount a bell-crank lever F, and secured in the arms $f$, of said bell-crank levers, and extending across the rear of the machine under the weights $D^3$, is a rod $F'$, adapted to raise and lower the weights $D^3$, when said bell-crank levers are operated. One end of the hollow shaft C, is closed by means of a cap G. At one side of the machine I secure a suction device H, which is driven by means of a motor $H'$, which suction device and motor are preferably mounted upon a bracket $H^2$, secured to one side of the machine. The suction device H, communicates with the interior of the hollow shaft C, by means of the duct $h$. The opposite end of the hollow shaft C, is provided with a closure cap J, which cap is adapted to be revolved on the hollow shaft C, by means of the handle $j$. The hollow shaft C, is provided with an opening $c'$, in the wall thereof, and the cap J, is provided with an opening $j'$, in the wall thereof adapted to register with the opening $c'$, in the shaft C, when the cap J, is rotated upon the hollow shaft C.

In order to stop the oscillation of the tubular arms $D'$, at the desired points over the type compartments $b$, when the weights $D^3$, are lowered by the movement of the bell-crank lever F, I provide vertically slidable stop bars K, (see Fig. 3), in the type case B, between the courses of the type compartments $b$, which stop bars are adapted to be moved upwardly by the action of the key mechanism hereinafter described, so as to engage the tubular arm $D'$, and stop its oscillation when the lower end $d$, thereof registers with one of the type compartments $b$.

Figure 3:
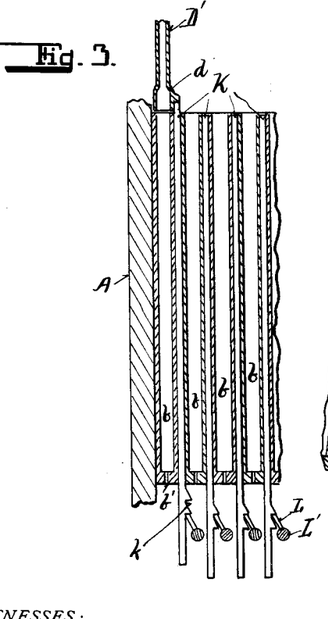
Fig. 3, is a fragmentary detail.
Figure 4:
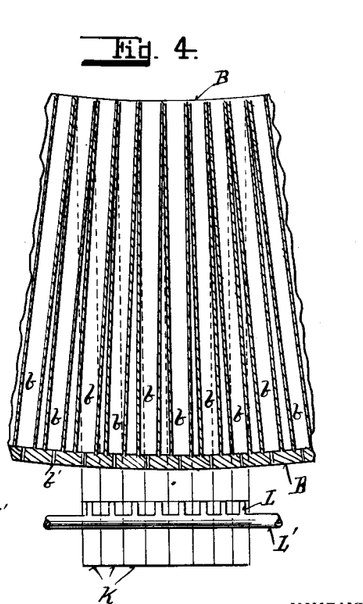
Fig. 4, is another view of same detail.
Figure 6:
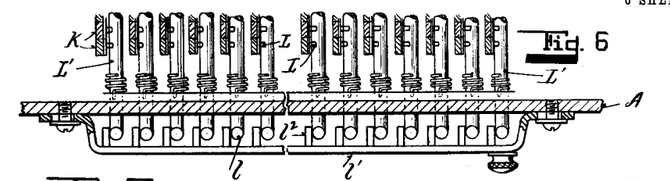
Fig. 6, is a top or plan view of the same.
Figure 7:
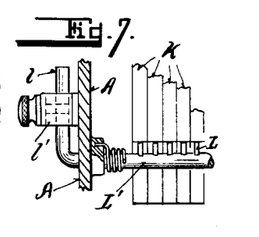
Fig. 7, is a front view of the same.

In order to retain the vertically slidable stop bars K, in their raised position as shown in Fig. 3, the lower ends of said bars are provided with notches $k$, which are adapted to be engaged by ratchet dogs L, secured on a rock shaft $L'$, mounted in a frame A, of the machine, there being one such rock shaft $L'$, for each row of stop bars K. The rock-shafts $L'$, are each provided with a spring, as shown in Figs. 6 and 7, adapted to normally maintain the dogs L, in the notches $k$, in the stop-bars K.

Figure 8:
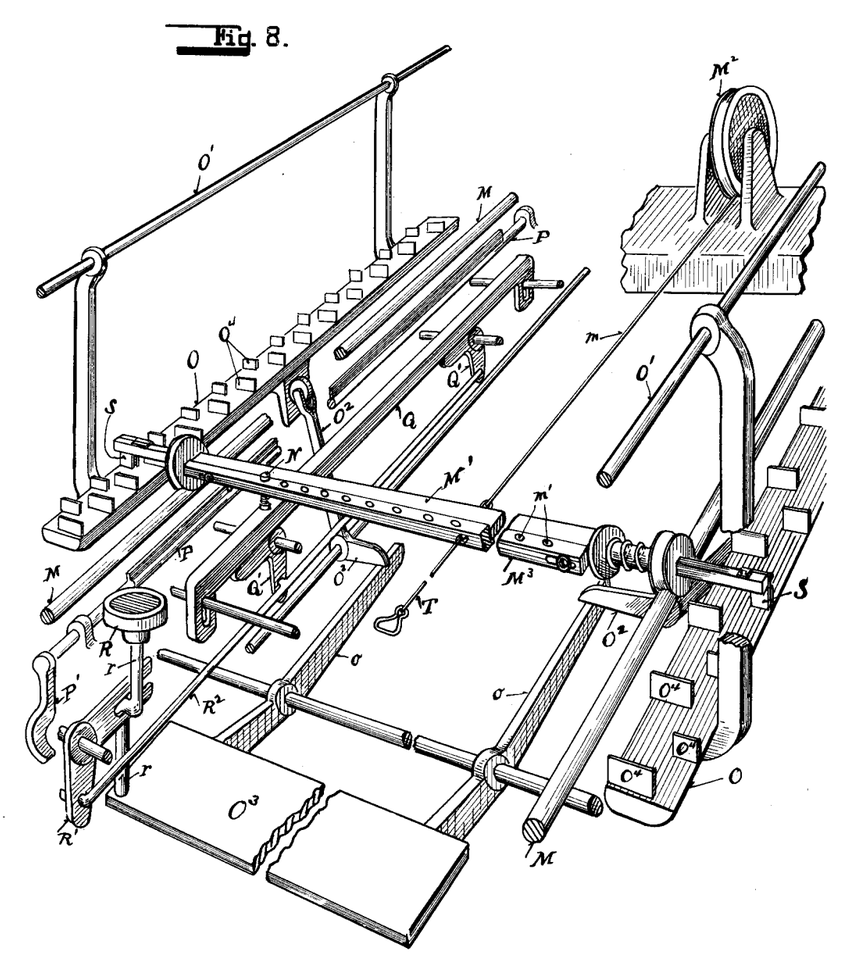
Fig. 8, is a view in perspective of the key and escapement mechanism removed from the machine, with portions thereof broken away.
Figure 9:
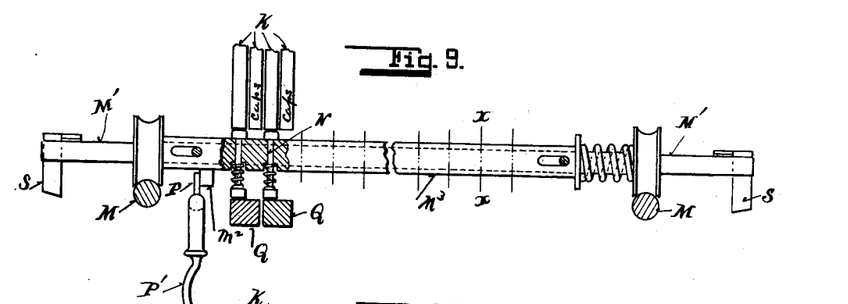
Fig. 9, is a fragmentary view in detail of a portion of my invention removed from the machine.

Mounted upon suitable ways M, (see Fig. 8) in the base of the machine there is a traveler $M'$, adapted to be moved toward the back of the machine by means of the spring motor mechanism $M^2$, and cord $m$. Secured upon said traveler $M'$, so as to be longitudinally slidable thereon, I secure a bar $M^3$, having vertical openings $m'$, therethrough, in which openings $m'$, downwardly spring pressed pins N, are placed. This traveler $M'$, and slidable bar $M^3$, are allowed to be moved to the back of the machine upon the ways M, by a spring motor $M^2$, step by step, by the action of the escapement mechanism O, at each end thereof, so that the spring pressed pins N, will at each backward step of the traveler M, stop immediately under a row of stop bars K. The escapement bars O, are suspended in the base of the machine upon rods $O'$, upon which rods said escapement bars are caused to oscillate by means of bell crank levers $O^2$, (see Fig. 8); the bell crank levers $O^2$, being operated by the space bar $O^3$, and its levers $o$.

To move the longitudinally slidable bar $M^3$, upon the traveler $M'$, I secure upon the under side of said bar a stud $m^2$, which is adapted to be engaged by a rock bar P, extending from the front to the back of the machine and is provided with a lever $P'$, for operating the same. Underneath the lower end of the pins N, and extending from the front to the back of the machine are horizontal, vertically movable bars Q, which are vertically operated by means of bell crank levers $Q'$, to raise the pins N, upwardly. The bell crank levers are operated by means of the keys R, through the bell crank lever $R'$, and connecting rod $R^2$, the stems $r$, of the keys R, engaging the space bar $O^3$, in their downward movement for the purpose of operating the escapement movement. The vertically movable horizontal bars Q, are of sufficient width on their upper faces to permit the pins N, to be carried laterally by the sliding bar $M^3$, without each of said pins being carried from its position above its proper bar Q.

The purpose of the sliding bar $M^3$, carrying the pins N, is to enable the operator of the machine to set either capitals, small letters or other characters, as may be desired, from a single key board, each alternate stop bar K, being for capital letters so that the endwise movement of the sliding bar $M^3$, carries the pins N, under the capital letter stop bars K.

Figures 10, 11, 12, 13:
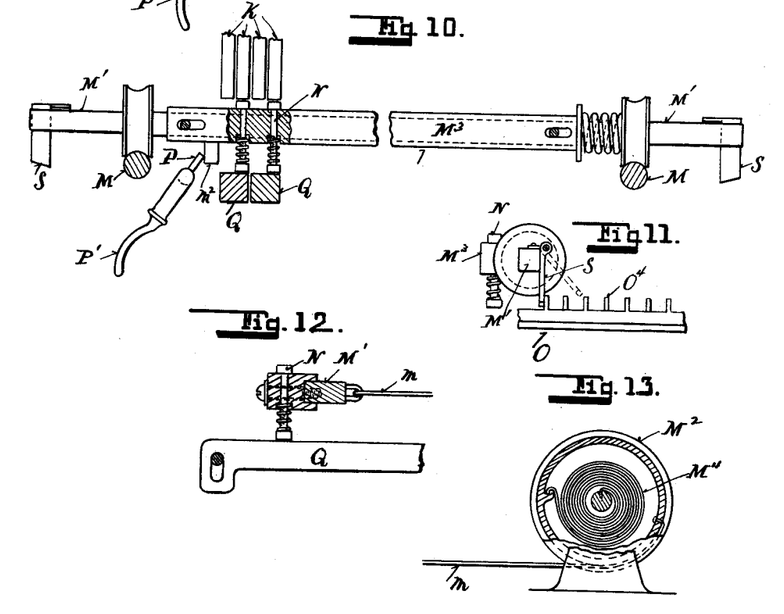
Fig. 10, is another view of the same.
Fig. 11, is an end view of the mechanism shown in Figs. 9 and 10.
Fig. 12, is a transverse section on any one of the lines $x$—$x$ in Fig. 9.
Fig. 13, is a fragmentary view of the spring motor mechanism of my machine.

The escapement bars O, are provided with stops $O^4$, arranged in staggered relation to each other so that the lateral movement of the escapement bars O, permits the hinged dogs S, on the ends of the traveler $M'$, to move from one stop to the next succeeding stop $O^4$, toward the back of the machine. When the traveler $M'$, has moved to the last stop $O^4$, on the escapement bars O, and it is desired to return the traveler again to the front of the machine to commence a new line, the operator pulls on the cord T, the hinged dogs S swinging over the stops O⁴, as shown by broken lines in Fig. 11.

Figure 1:
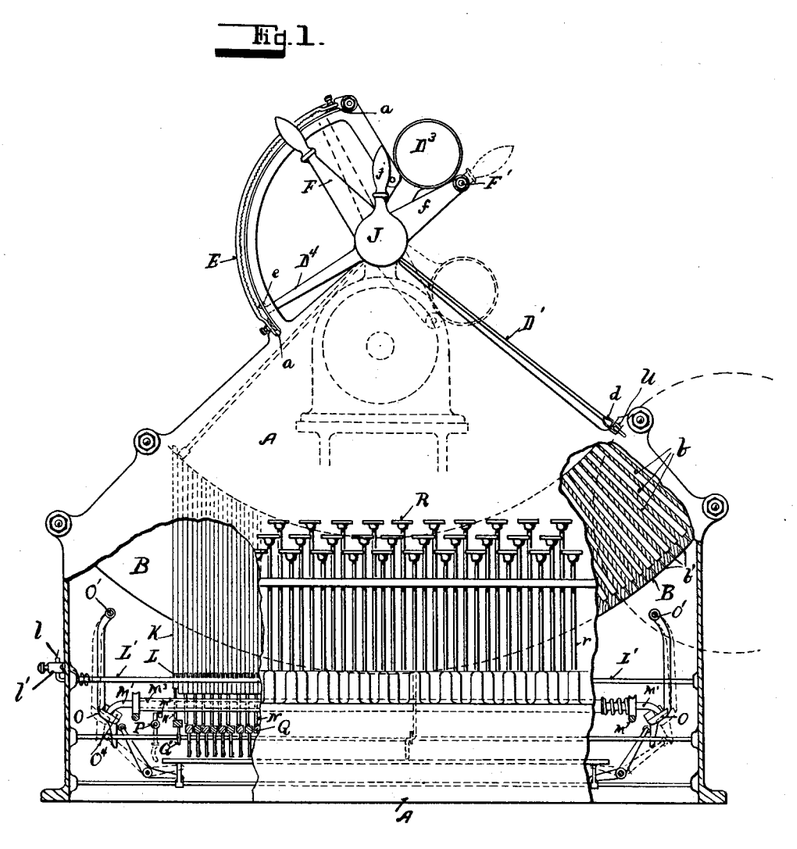
Figure 1, is a front view in elevation of a type setting and distributing machine embodying my invention, with parts thereof broken away.
Figure 5:
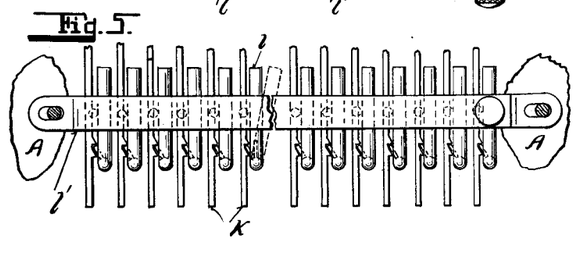
Fig. 5, is a fragmentary view in detail in side elevation of the stop mechanism of my machine.

For releasing the stop bars K, at the end of each line, I provide the rock shafts L', with upturned ends l, which extend outwardly through the side of the machine as shown in Fig. 1, and on the outside of the machine is provided a sliding bar l', which has studs l², (see Fig. 6), adapted to engage the ends l, of said rock shaft L', and rotate them backwardly as shown in Fig. 5, so that the dogs L, will release the stop bars K, and let them drop to their initial position. The spring motor mechanism M², shown in these drawings is a hollow pulley having therein a spring M⁴, adapted to rotate the pulley in one direction.

Figure 14:
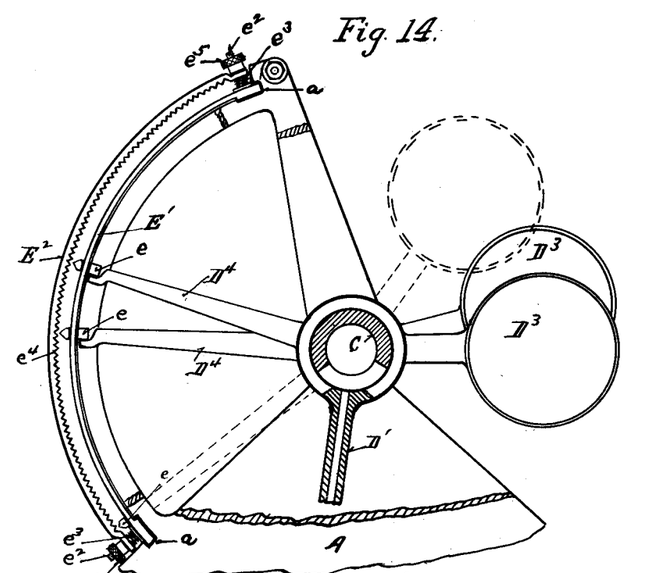
Fig. 14, is an enlarged end view of the record element in place in the frame of the machine, portions of said machine being broken away.
Figure 15:
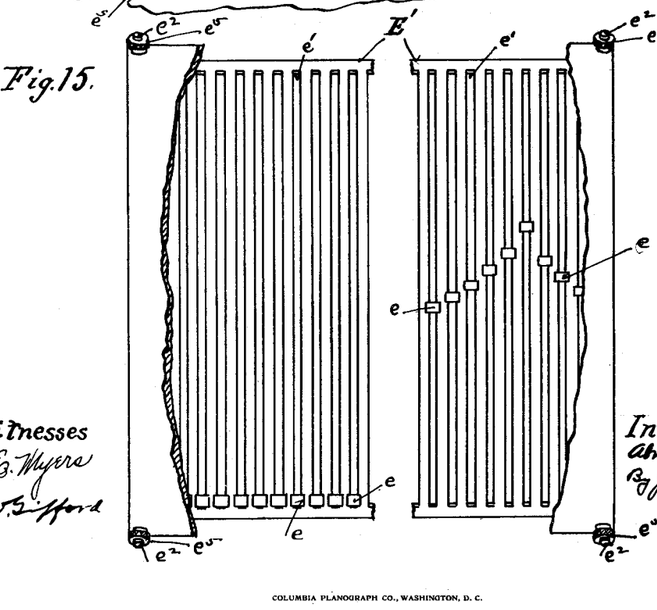
Fig. 15, is a front view of the record element removed from the machine, having portions thereof broken away.

The record element E, has a capacity for distributing one line of type, and has to be taken out of the machine and a new record inserted for each line of type desired to be distributed back into the type compartments b, of the type case B. This record element E, is composed of a curved plate E', (see Figs. 14 and 15) provided with transverse slots e', there being a slot e', in said plate E', for each hollow type arm D', in the machine. In each of the slots e', I place a slidable stop e. This curved and slotted plate E', is provided at its corners with screw-bolts e², and upon these bolts e², I place springs e³, and I then place upon the bolts e², a curved plate E², having longitudinal grooves e⁴, in its inner or concaved face adapted to receive the outer end of the stop e, and upon the bolts e², I place nuts e⁵, which retain the plate E², in place, and by means of which the plate E², may be forced inward toward the slotted plate E', until the stops e, enter the grooves e⁴, so that they are locked in the position to which they are raised by the arms D⁴.

I have not shown a composing stick mechanism for receiving type from the ends d, of the tubular arms D', as such mechanism is fully shown and described in my aforesaid Letters Patent and forms no part of this invention, and it is apparent to those skilled in the art, that I may or may not use such a mechanism, as I may desire.

Figure 2:
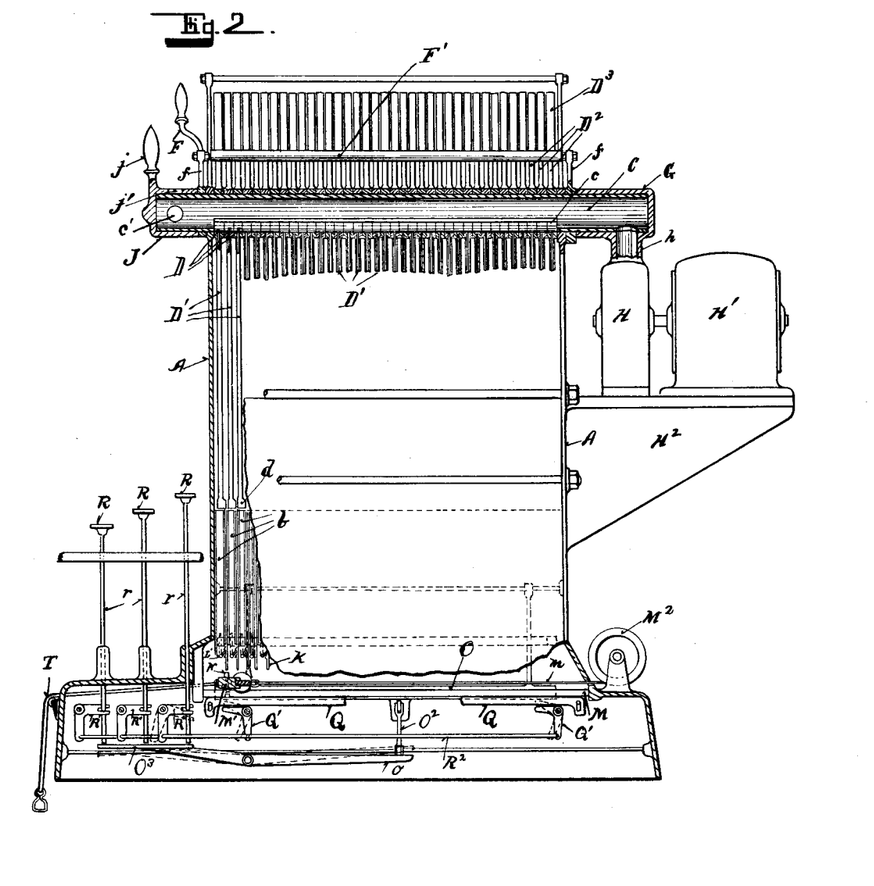
Fig. 2, is a side view of same partially in elevation and partially in section.

In operation, the type case B, being filled with type, I insert into the machine a record element E; I then press down the proper keys R, which operate the escapement mechanism O, and S, to stop the traveler M', so that the pins N, will be directly under a series of stop-bars K, and which, through the lever and connecting rod mechanisms R', R², and Q', raise the bars Q, upwardly thereby through the pins N, pushing the relative stop bars K, upward, and said bars will be held in such upward position by the dogs L, until all the stop bars K, for an entire line of type to be set, have been raised; I then move the lever F, to the position thereof shown by broken lines in Fig. 1, which permits the weights D³, to move the tubular arms D', until each one is stopped in its oscillation by reason of the lower ends d, engaging the upper end of the stop bar K, as shown in Fig. 3, and as shown by broken lines in Fig. 1; this movement of the tubular arms D', causes the arms D⁴, to move stops e, in the record element E, to the desired position for reproducing said positions of the tubular arms D', when it becomes necessary to distribute said line of type back into the type case B. The record element is then locked by turning down the nuts e⁵, thereby forcing the plate E², toward the plate E', until the outer ends of the stops e, enter the grooves e⁴, in the inner face of the plate E². The arm j, on the closure cap J, is then turned to the position thereof shown in Fig. 2, which prevents air from entering into the hollow shaft C, through the opening c', thereby causing a type from each of the compartments b, in the type case B, to be drawn upward into the lower end d, of the tubular arms D'; I then move the lever F, back to the position thereof shown by full lines in Fig. 1, which gathers all of the tubular arms D', into alinement so that the lower ends d, are immediately over the type receiving groove U, (see Fig. 1), when the lever j, on the closure cap J, is again moved so as to permit air to enter into the hollow shaft C, which releases the type held in the lower ends of the tubular arms D', and permits said type to drop into the groove U, from whence said type can be removed as may be desired; the type being in the groove U, I then grasp the cord T, and draw the traveler back to the starting position for another line; I then move the sliding bar l', to release the stop bars K, and permit them to drop back to their initial position. I then remove the locked record element E, and insert the new record element for another line of type, when the machine is ready to repeat the operation for setting a new line of type.

It is apparent from the foregoing description, that when it is desired to distribute a line of type from the groove U, by moving the lever F, to the position thereof shown in Fig. 1, the tubular arms D', will be gathered into line as shown in Fig. 1, and that by then moving the arm j, so as to prevent air from entering into the hollow shaft C, through the opening c'. type in the groove U, will be drawn into the ends d, of the tubular arms D', and then by moving the lever F, to the position thereof shown by broken lines in Fig. 1, the tubular arms D', will be oscillated by means of the weights D³, until their respective arms D⁴, contact with their relative stops e, in the record element E, then by moving the arm j, so as to admit air into the hollow shaft C, the type in the ends $d$, of the tubular arms D', will be released and permitted to drop into its proper compartment, with which the ends $d$, of said tubular arms coincide.

From the foregoing, it will be observed that by the use of my invention, I am enabled to produce a record element from which type may be distributed simultaneously with the setting up of said line of type.

Having thus shown and described my invention so as to enable others to construct and operate the same, what I claim as new and desire to secure by Letters Patent, is:—

1. In a machine of the character described, the combination of a type receptacle having an open upper end, a type-line receiving means, a pneumatic carrier mechanism adapted to lift type from the upper end of said receptacle and deposit them in said receiving means, and key controlled stop mechanism adapted to limit the movement of said pneumatic carrier, substantially as set forth.

2. In a mechanism of the character described, the combination of a tubular type receptacle adapted to contain type one above the other, a type-line receiving means, pneumatic mechanism adapted to raise one type at a time from said receptacle and carry it to and deposit it in said type-line receiving means, and key controlled stop mechanism adapted to limit the movement of said pneumatic carrier, substantially as set forth.

3. In a machine of the character described, the combination of a series of type receptacles, a type-line receiving means, a series of pneumatic carriers adapted to be operated to carry type from said type receptacles and deposit them in said type-line receiving means, a record element in said machine, key controlled stop mechanism adapted to limit the movement of said pneumatic carriers, and mechanism adapted to record on said record element, the limitations of movement of said pneumatic carriers, substantially as set forth.

4. In a device of the character described, a type-case composed of type compartments having vents in the bottoms thereof and open ends, a tubular arm adapted to be moved so that one end thereof will pass adjacent to the open end of each of said type compartments, key controlled means adapted to limit the movement of said tubular arm, and means to exhaust air from said tubular arms, substantially as set forth.

5. In a device of the character described, a series of type-cases each composed of type compartments having vents in the bottoms thereof and open ends, a series of tubular arms adapted to be moved so that one end of each of said arms will pass adjacent to the open ends of each of said series of type-cases, key-controlled stop mechanism mounted in said series of type-cases adapted to limit the movement of said tubular arms, and means to exhaust air from said tubular arms, substantially as set forth.

6. In a device of the character described, a series of type-cases each composed of type compartments having vents in the bottoms thereof and open ends, a series of tubular arms adapted to be moved so that one end of each of said arms will pass adjacent to the open ends of each of said series of type-cases, key-controlled mechanism mounted in said series of type-cases adapted to limit the movement of said tubular arms, a record element in said machine, mechanism adapted to record on said record element the limitations of movement of said tubular arms, and means to exhaust air from said tubular arms, substantially as set forth.

7. In a device of the character described, a segmental type-case composed of radial type compartments having vents in the bottoms thereof and open ends, a tubular arm pivotally mounted at the axis of said segmental type-case so that its lower end will pass adjacent to the open ends of said radial type compartments, means to oscillate said tubular arm, key-controlled means mounted adjacent to said segmental type compartments adapted to engage the lower end of said tubular arm so that the same will register with the open end of one of said type compartments, and means to exhaust air from said tubular arm, substantially as set forth.

8. In a device of the character described, a series of segmental type cases each composed of radial type-compartments having open ends, a series of tubular arms pivotally mounted at the common axis of said segmental type-cases so that their lower ends will pass adjacent to the open ends of the compartments in each one of said series of type-cases, key-controlled stop bars mounted between said segmental type-cases adapted to engage and limit the oscillation of each of said tubular arms so that the lower ends thereof will register with the desired compartment in each of said series of type-cases, a record element in said machine, movable stops in said record element, mechanism adapted to move said record stops when said tubular arms are permitted to oscillate, means to secure said record stops in adjusted position, and means to exhaust air from said tubular arms, substantially as set forth.

9. In a device of the character described, a segmental type-case composed of radial type compartments having open ends, a tubular arm pivotally mounted at the axis of said segmental type-case so that its lower end will pass adjacent to the open ends of said radial type compartments, means to oscillate said tubular arm, means to exhaust air from said tubular arms, a stop bar for each of said radial type compartments slidably mounted beside said segmental type-case, notches on said stop bars, a rock shaft mounted in said machine adjacent to the lower ends thereof, dogs on said rock-shaft adapted to engage said notches, means to rock said rock-shaft, and key actuated mechanism adapted to slide said stop bars upwardly, substantially as set forth.

10. In a device of the character described, a series of segmental type-cases composed of radial type compartments having open ends, a series of tubular arms pivotally mounted at the axis of said segmental type-cases so that their lower ends will pass adjacent to the open ends of said radial type compartments, means to oscillate said tubular arms, means to exhaust air from said tubular arms, stop bars for each of said radial type compartments slidably mounted between said segmental type-cases, notches on said stop bars, rock-shafts adjacent to said stop bars, dogs on said rock-shafts adapted to engage said notches, means to rock said rock-shaft, a traveler slidably mounted in said machine, motor mechanism adapted to move said traveler in one direction, escapement mechanism adapted to stop said traveler underneath each series of stop bars, vertically slidable pins in said traveler adapted to engage the lower ends of said stop bars, a vertically movable horizontal bar under each of said pins, and key actuated mechanism adapted to give vertical movement to said horizontal bars, substantially as set forth.

11. In a device of the character described, a series of segmental type-cases composed of radial type compartments having open ends, a series of tubular arms pivotally mounted at the axis of said segmental type-cases so that their lower ends will pass adjacent to the open ends of said radial type-compartments, means to oscillate said tubular arms, means to exhaust air from said tubular arms, a series of stop bars for each of said radial type compartments slidably mounted between each of said segmental type-cases, means to retain said stop-bars in a raised position, means to release said stop bars, a traveler slidably mounted in said machine, motor mechanism to move said traveler in one direction, escapement mechanism adapted to cause said traveler to pause at each series of stop bars, a bar having vertical openings therethrough slidably mounted on said traveler, vertically slidable pins mounted in said slidable bar, means to move said bar longitudinally on said traveler, a vertically movable horizontal bar under each of said slidable pins, bell-crank levers under each of said horizontal bars, and key actuated mechanism adapted to operate said escapement mechanism, and said horizontal bars, substantially as set forth.

In testimony whereof I affix my signature, in presence of two witnesses.

ABRAHAM SMITH.

Witnesses:
  P. V. GIFFORD.
  E. E. MYERS.

---

Copies of this patent may be obtained for five cents each, by addressing the "Commissioner of Patents, Washington, D. C."